March 26, 1935.  T. W. MURPHY  1,995,480
RELIEF VALVE
Filed Feb. 24, 1934  2 Sheets-Sheet 1
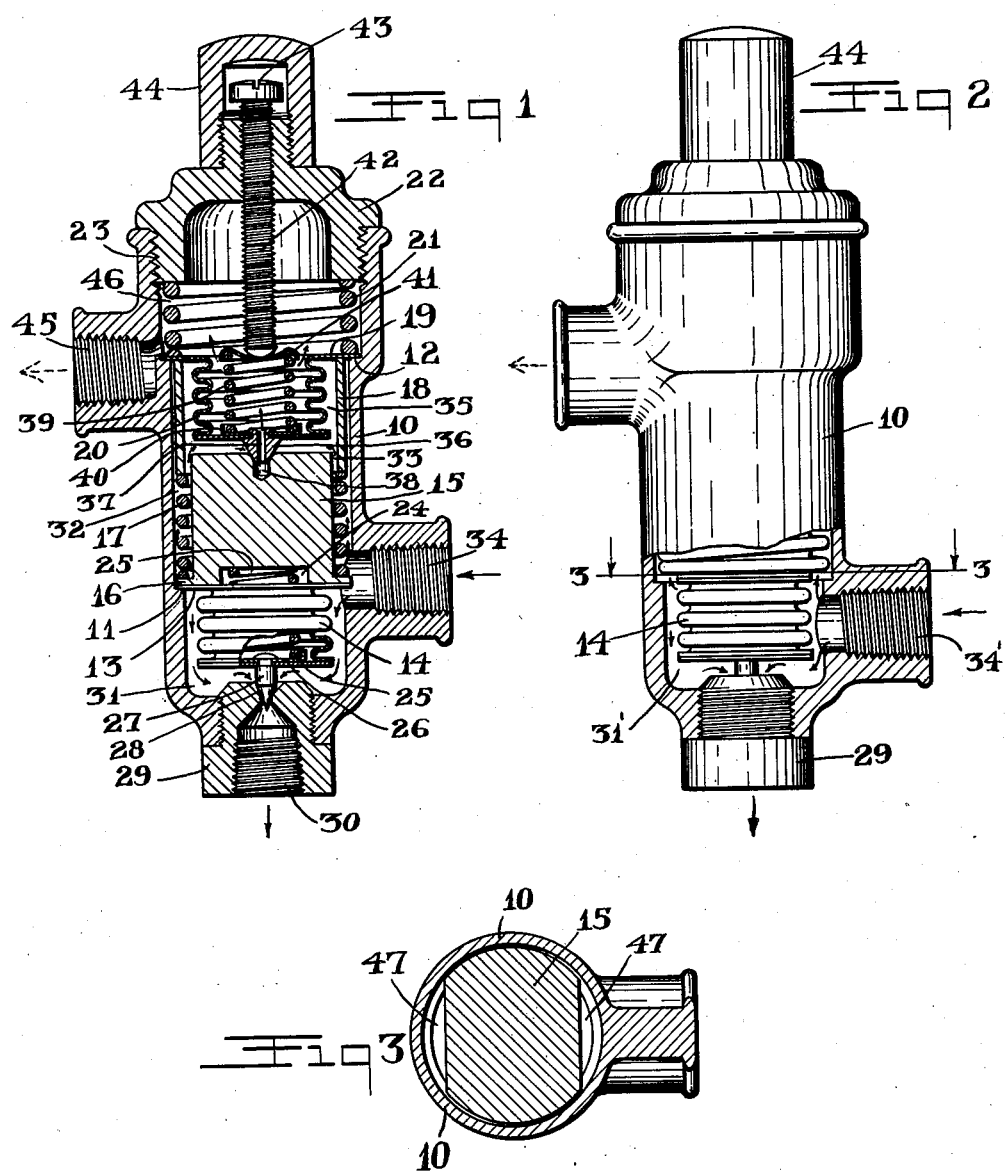

March 26, 1935.  T. W. MURPHY  1,995,480
RELIEF VALVE
Filed Feb. 24, 1934  2 Sheets-Sheet 2
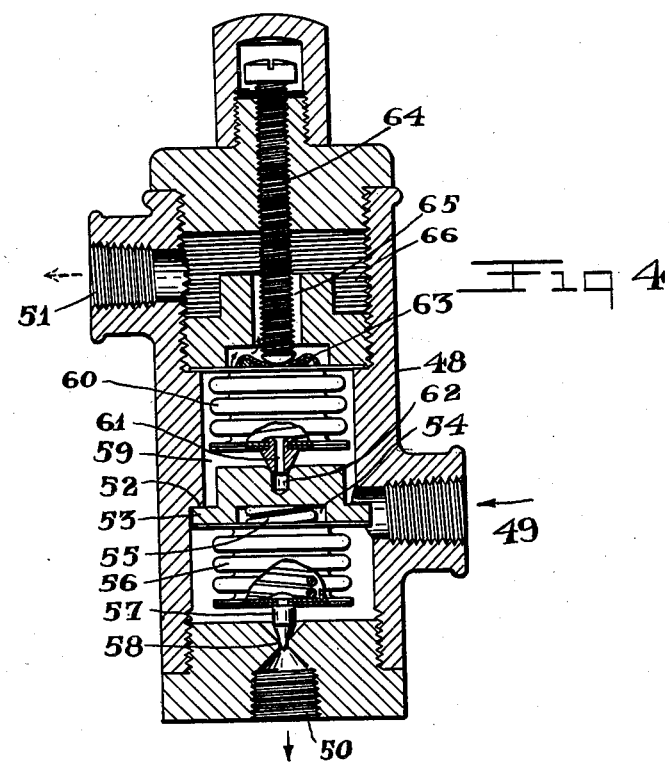
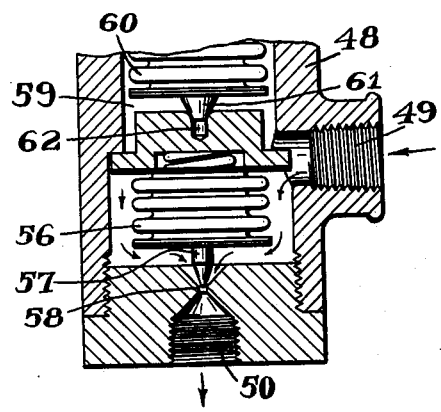
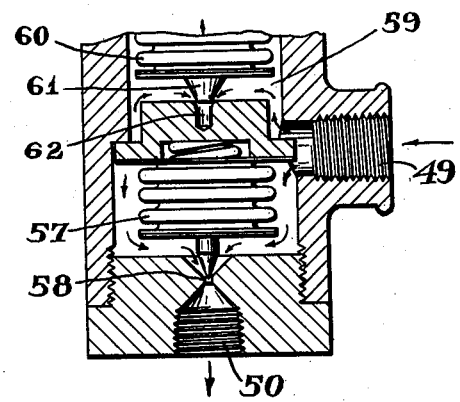
WITNESSES:
INVENTOR:
Thomas W. Murphy
BY
ATTORNEY Patented Mar. 26, 1935

1,995,480

UNITED STATES PATENT OFFICE 1,995,480

RELIEF VALVE

Thomas W. Murphy, Bala-Cynwyd, Pa., assignor to Monarch Manufacturing Works, Inc., Philadelphia, Pa., a corporation of Delaware Application February 24, 1934, Serial No. 712,761

7 Claims. (Cl. 137—153)

This invention relates to relief valves and has for an object to provide a valve which will automatically open, responsive to a predetermined pressure, and with a second valve which opens for relief upon the rise of the pressure above a predetermined maximum.

A further object of the invention is to provide a relief valve organization having a housing in which is located two valves automatically opening under predetermined different pressures, one of said valves opening communication to the point of use, the other valve opening communication to a by-pass which may return the fluid to the original source, or otherwise.

The valve disclosed in the application, while of general utility, is particularly designed for use in oil burner installations, providing as it does, one valve which will automatically open to permit the flow of oil to the burner when a predetermined pressure has been generated by the pump, and a second valve which will automatically open to relieve excessive pressure and volume when the predetermined maximum pressure has been exceeded, such second valve communicating with the by-pass conduit returning the excess oil to the tank, or other source of supply.

An object of the invention is, therefore, to provide a valve housing of convenient size, type and construction, for introduction into and cooperation with an oil heating system, or for such other purpose as it may be found desirable, and which shall automatically operate to maintain at the spray nozzle or burner the pressure and volume required for the maximum efficiency and operation of the burner.

A further object of the invention is to provide in a housing a valve having connection with a member compressible by the surrounding liquid, and when compressed, open the valve and also to introduce into the chamber a second valve with a compressible part controlling such valve, which will open under a predetermined pressure greater than the pressure required by the first valve and permit the flow of the excess fluid through such compressible member to by-pass.

The invention, therefore, comprises a housing of any desired type, shape or size incident upon the installation to which it is to be applied, with an inlet port and two outlet ports, with a valve controlling one of said outlet ports having an entirely closed compressible diaphragm actuating said valve, with means for exerting the required tension upon said diaphragm to insure the opening of the valve at, and only at the generation of the pressure required for efficient operation of the burner, and with a second valve located in any approved relation to the first mentioned valve and having a compressible member also immersed in the liquid and normally closed, while the first valve is opened but with variable tension means to control the opening of the second valve when the pressure within the housing has exceeded a predetermined maximum, said second valve being arranged to communicate with the second outlet opening of the housing for by-passing the excess volume of liquid back to the tank or otherwise.

The drawings illustrate several embodiments of the invention and the views therein are as follows:

Figure 1 is a view of one embodiment of the relief valve shown in diametrical section through all of the ports, Figure 2 is a view partly in side elevation of the housing, with parts of the housing broken away to show in side elevation some of the internal parts, Figure 3 is a transverse sectional view taken on line 3—3 of Figure 2, Figure 4 is a diametrical sectional view of a slightly modified type of the valve, Figure 5 is a view on the same plane as Figure 4, showing the valve to the burner open and the by-pass valve closed, and Figure 6 is a figure similar to Figure 5 showing the by-pass valve open.

Like characters of reference indicate corresponding parts throughout the several views.

The improved relief valve which forms the subject-matter of this application may take a great variety of forms and arrangements of parts. The type as shown in the drawings has been found to be a convenient, economical and pleasing arrangement, but it is to be understood that the description of the invention directed to this particular type as shown is only explanatory and no limitation upon any other form, shape or arrangement.

In the type as shown then, a housing 10 is employed having an annular shoulder 11 and a second annular shoulder 12. Upon the annular shoulder 11, the flange 13 of the corrugated diaphragm 14 is positioned and held in such relation by a block 15 which sets upon the flange, itself being provided with a flange 16 for that purpose.

Surrounding this block 15 is a spring 17, and seated upon the top of the spring 17 is a sleeve 18. Upon the top of the sleeve 18 is positioned the flange 19 of the corrugated diaphragm 20 and upon this flange 19, means is provided for holding both flanges seated. In the drawings at Figure 1 a spring 21 is shown for this purpose, maintained by means of a cap 22 connected with the housing by means of the threads 23. It is to be understood that this is merely a selection of means, and that any means for holding the parts assembled as shown are within the scope of the invention.

The block 15 is provided with a recess 24 and a spring 25 is seated one end in such recess 24, and bears at its opposite end in a cup 26 within the corrugated diaphragm 14.

The corrugated diaphragm 14 is entirely closed and sealed so that, added to the tension of the spring 25 therein, is the contained air which is placed under tension with the collapsing of the diaphragm. The pressure at which the device is to initially operate is determined and the spring 25 is of such tension as to provide the necessary pressure within the diaphragm.

A needle valve 27 is rigidly secured to the cup 26 and the underlying parts of the diaphragm and coacts with a valve seat 28 formed in the bushing 29, which has a female thread 30 for association with a conduit. In the preferred use of the device the conduit connecting with the thread 30 will lead to an oil burner, but it is obvious that the device is as efficient for other purposes.

About the corrugated diaphragm 14 a chamber 31 is provided, and above the diaphragm an annular chamber 32, such annular chamber being provided by the space between the housing and the block 15.

The spring 17 is located within this annular chamber and a space shown at 33 is provided between the block 15 and the sleeve 18 so that fluid under pressure entering through the nipple 34 will pass not only into the chamber 31, but upwardly in through the annular chamber and space 33 into the chamber 35 about the corrugated diaphragm 20. This diaphragm 20 carries a valve 36 having a longitudinal bore 37 seated in a recess 38 formed in the block 15.

Within the corrugated diaphragm 20 is a spring 39 which bears in a cup 40 on the base of said diaphragm. The top of the spring 39 is covered by a washer 41 concave in its upper surface with a screw 42 engaging said washer and adapted to exert variable pressure thereon, controlled through the slotted head 43. This slotted head 43 is preferably covered by a cap 44 which is put in position after the adjustment has been made.

An outlet or by-pass nipple 45 communicates with the chamber 46 in which is located the spring 21 or such other means as may be provided for maintaining the assembly of the parts.

At Figure 2 there is a slight variation in that the nipple 34' is differently positioned to introduce the fluid directly into the chamber 31 only. The block 15' in this case is arranged to provide passage between the chamber 31' and the chamber 46 forming passages, as indicated at 47 in Figure 3. Otherwise, the device as shown at Figure 2 corresponds exactly with that as shown at Figure 1.

At Figure 4 a modification is shown having a housing 48 with inlet nipple 49, outlet nipple 50 to burner, and outlet nipple 51 to by-pass. In this instance the shoulder 52 on the housing is arranged to support the upward thrust of the flange 53 which is provided with the recess 54 for accommodating the spring 55.

The corrugated diaphragm 56 is likewise supported by the normal pressure of the parts above and the engagement of the needle valve 57 with the seat 58 when the valve is closed. When opened, the pressure upwardly on the shoulder 52 is, of course, increased. The inlet nipple also communicates with the chamber 59 having the corrugated diaphragm 60 therein, and a needle valve 61 having a passage therethrough, as explained in regard to Figure 1, likewise seated in a recess 62. The diaphragm is provided with a similar washer 63 and tension screw 64.

At Figure 5 is shown the first step in the operation of the device, substantially identical in all embodiments. When fluid under pressure is admitted through the nipple 34 or 49 to surround the flexible corrugated diaphragm 14 or 56, the pressure, if sufficient, will raise the needle valve 27 or 57 from its seat 28 or 58 so that the flow of liquid will be as indicated by the arrows.

While it has been stated that other means than the spring 21 as shown in Figure 1, could be substituted therefor, as indicated at Figure 4, when the spring is employed it serves as a safety valve. In normal action, the pump will deliver a volume greater than will pass through the valve seat 28, and will make use of the by-pass for accommodating the excess. It occurs, however, that the valve seat might become clogged or other obstructions presented to the proper flow of oil through the valve seat 28 in which case the pressure and volume of oil delivered from the pump would be in excess of that which would pass through the passage 37 in the valve 36.

When and if this occurs the pressure of the oil beneath the flange 12 will lift the entire inner structure against the tension of the spring 21, and permit the outflow of oil therethrough to the by-pass 45.

So long as the pressure is sufficient to hold a valve 57 from its seat, and not excessive, the parts will continue to function in the position as shown at Figure 5.

When, however, the pressure becomes greater than is considered efficient, the fluid under pressure will flow upwardly into the chamber 59, as indicated by the arrows, and acting about the exterior of the corrugated diaphragm 60, will lift the needle valve 61 so that the fluid will enter first into the recess 62 and then upwardly through the central bore of the needle valve within the diaphragm and through the passage 65 into the chamber 66 and outwardly through the nipple 51.

As the outlet through the nipple 51 is ample to take care of the by-passed liquid, substantially no pressure will build up within the interior of the corrugated diaphragm 60, and such diaphragm will, therefore, be maintained in compressed condition so long as the pressure remains within the chamber 59, and will, therefore, hold the valve open. If and when the pressure decreases, the valve 61 automatically closes under the tension of the spring within the diaphragm but the valve 57 remains still open and operative until the pressure drops below the minimum whereupon the valve 57 will also close and discontinue feeding oil to the burner or other point of use.

Of course, the relief valve herein set forth may be modified and changed in various ways without departing from the invention herein described and hereinafter claimed.

I claim:—

1. A relief valve comprising a housing having annular shoulders formed therein with outlet ports and an inlet, members seated upon the annular shoulders carrying corrugated diaphragms, one of which is sealed with tension spring therein, valves carried one by each of said diaphragms, a bushing having a valve seat arranged for coaction with one of said valves, a member having a recess mounted for coaction with the other of said valves, said last mentioned valve having a passage therethrough and into the diaphragm, means for exerting variable tension upon said last mentioned diaphragm, and means forming a conduit from said last mentioned diaphragm to by-pass.

2. A relief valve comprising a housing having outlet ports and an inlet port, valves controlling said outlet ports, flexible diaphragms provided with springs mounted therein, one of said diaphragms being sealed and one acting as a collapsible conduit, both said diaphragms controlling and moving in the same direction to open said valves, and means to exert greater tension upon one of said valves than on the other.

3. A relief valve comprising a housing having outlet ports and an inlet port, one of said outlet ports being provided with a valve seat, yieldingly mounted means located within the housing providing a second valve seat, valves cooperating with both of said seats, one of said valves having a passage axially therethrough, flexible diaphragms controlling both of said valves, means to vary the tension upon the valve having the passage but continuously at a greater tension than the other valve, and means forming a conduit from said valve with the passage to by-pass.

4. A relief valve comprising a housing having a plurality of annular shoulders formed therein and with outlet ports and an inlet port, flanged members seated upon both of said shoulders, means for holding both of said flanged members seated upon said shoulders, a sealed flexible diaphragm with tension spring mounted therein carried by one of said flanged members, a valve carried by said flexible diaphragm, a bushing cooperating with the housing and provided with a valve seat for cooperation with said valve, one of said flanged members being provided with a recess, a second flexible diaphragm, a valve carried by said second diaphragm having passage axially therethrough, said valve being positioned to cooperate with said recess, and means forming a conduit from said second flexible diaphragm to by-pass.

5. A relief valve comprising a housing having outlet ports and an inlet port, annular shoulders formed within said housing and spaced apart, a flanged member engaging one of said shoulders and provided with a depression, a spring seated in said depression, a sealed corrugated diaphragm embracing said spring, a valve carried by said diaphragm, a bushing cooperating with said housing and providing a valve seat for cooperation with said valve, said flanged member being provided with a recess, a second flanged member bearing upon the other annular shoulder, a second corrugated diaphragm carried by said flanged member, a spring disposed within said corrugated diaphragm, a valve carried by said diaphragm and provided with an axial passage, said valve being positioned to cooperate with the recess in said first mentioned flanged member and with the interior of said second corrugated diaphragm, said diaphragm being at its opposite end open, means forming a passage from said open end of and through the diaphragm to by-pass, and means to exert variable pressure upon the spring within said second diaphragm.

6. A relief valve comprising a housing having outlet ports and an inlet port, valves controlling said outlet ports, flexible diaphragms having springs mounted therein and one of said diaphragms being sealed, said diaphragms controlling said valves and one of said springs exerting greater tension upon its valve than the other spring, and a safety relief functioning at a pressure greater than that resisted by either of said springs or diaphragms.

7. A relief valve comprising a housing having a valve therein, a sealed diaphragm associated with said valve, a spring located within said sealed diaphragm and placed under predetermined tension, a second valve, a flexible diaphragm controlling said second valve, said second valve providing passage entirely through said diaphragm, and spring controlled means for relieving internal pressure voluminally in excess of the capacity of said valves.

THOMAS W. MURPHY.